May 13, 1969   L. R. KOTARSKI   3,443,449
GEAR ENGAGEMENT DEVICE

Filed Oct. 16, 1967

INVENTOR
LESTER R. KOTARSKI

BY Theodore B Roessel
ATTORNEY

May 13, 1969 L. R. KOTARSKI 3,443,449
GEAR ENGAGEMENT DEVICE
Filed Oct. 16, 1967 Sheet 2 of 2

INVENTOR
LESTER R. KOTARSKI
BY Theodore B. Roessel
ATTORNEY

United States Patent Office 3,443,449
Patented May 13, 1969

3,443,449
GEAR ENGAGEMENT DEVICE
Lester R. Kotarski, Victor, N.Y., assignor to Ritter Pfaudler Corporation, Rochester, N.Y., a corporation of New York
Filed Oct. 16, 1967, Ser. No. 675,653
Int. Cl. F16h 1/04, 57/00
U.S. Cl. 74—422            9 Claims

ABSTRACT OF THE DISCLOSURE

A pinion, resiliently coupled to a rotating drive shaft, is carried by the shaft toward engagement with a rack. A spring loaded roller, adapted to mesh with the pinion and located an integral number of pitch lengths from the rack, and in the path of the pinion engages and rotates the pinion with respect to the drive shaft against the resilient coupling to orient the pinion to the rack so that the pinion teeth will be in the correct relationship to mesh smoothly with the rack. A positive drive dog also carried by the rotating drive shaft then engages the pinion and drives it through the rack.

Background of the invention

The present invention relates to gear orienting devices, and more specifically, to such a device which can orient a pinion or gear while it is in motion, so that its teeth will be in the correct relationship to a rack or other gear to be engaged to insure that they will mesh smoothly when brought together.

The invention is designed to prevent interference and possible damage to gear teeth when two gears, one stationary such as a rack, and one in motion such as a rotating pinion are meshed. The problem of orienting a linearly moving rotating pinion with a stationary rack would occur in systems in which a rail guided vehicle is used which has at least two driving means, one of the driving means being a rack and pinion engaged for only a portion of the travel. For example, the vehicle could have a friction drive along a horizontal section of the rail or trackway and a positive drive, such as the rack and pinion, for moving the vehicle along an inclined or vertical section of the rail or trackway. In such a situation, the transition from frictional drive in the horizontal direction to positive drive in the vertical direction is preferably accomplished without stopping the vehicle. For this reason the pinion must be rotating while the vehicle is in friction drive and must be correctly oriented with respect to the rack so as to prevent destructive interference between the pinion and rack when the two attempt to mesh.

Summary of the invention

In the present invention, a rail guided vehicle is driven horizontally by a drive wheel which frictionally engages the horizontal section of monorail track. A drive pinion, which is rotatably mounted on the friction wheel drive shaft, is resiliently coupled to the drive shaft so that the pinion will rotate in an idle condition during the horizontal course of travel. Just prior to entering the positive or vertical drive stage, a spring mounted roller located at the entrance to the rack engages and rotates the pinion either clockwise or counterclockwise with respect to the drive shaft and against the resilient coupling until the pinion is in the correct position to mesh smoothly with the rack. The roller then holds the pinion in this correct orientation while the drive shaft continues to rotate compressing the resilient coupling until a drive dog carried by the shaft engages and drives the pinion through the rack.

Objects of the invention

It is an object of my invention to provide a gear engagement device which prevents destructive interference between gears being meshed.

Another object of my invention is to provide a gear engaging device which positions moving gears for smooth interference free engagement with stationary gears.

Still another object of my invention is to provide a means for smoothly engaging a rack and pinion drive which orients a pinion while it is rotating and moving toward a rack so that the pinion and rack will mesh smoothly and without interference.

A further object of my invention is to provide means for smoothly engaging a rack and pinion drive which eliminates the need for stopping the linear motion of a rotating pinion in order to orient the pinion for smooth interference free engagement with a rack.

A still further object of my invention is to provide means for smoothly engaging a rack and pinion drive for rail guided vehicles which enables the vehicle to make a transition from friction drive to positive rack and pinion drive without stopping.

A yet further object of my invention is to provide means for smoothly engaging a rack and pinion drive for rail guided vehicles which permits a transition from horizontal friction drive to vertical rack and pinion drive without stopping the forward motion of the vehicle.

Description of the preferred embodiments

Figure 1:
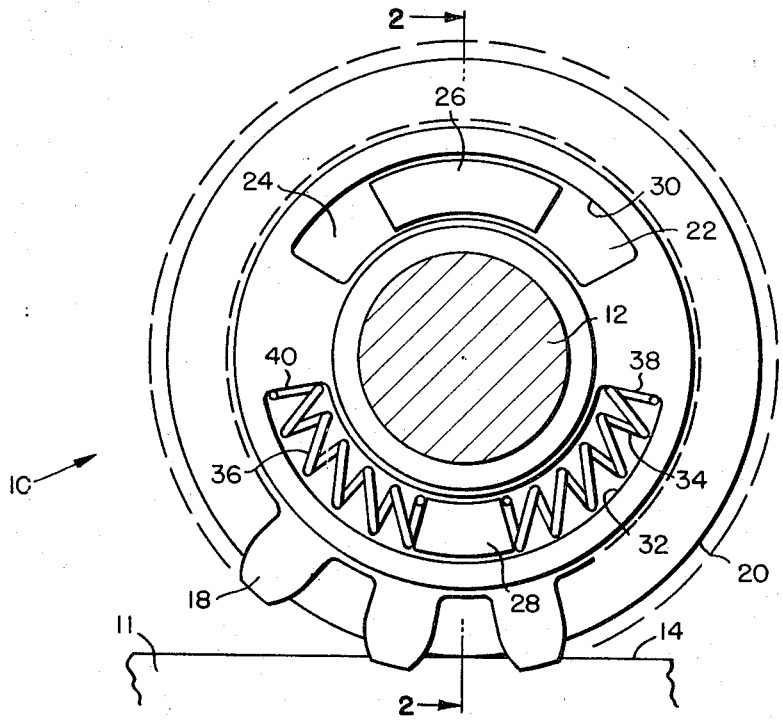
FIGURE 1 is an elevation view partly broken away of the friction and positive mechanism of my invention.
Figure 2:
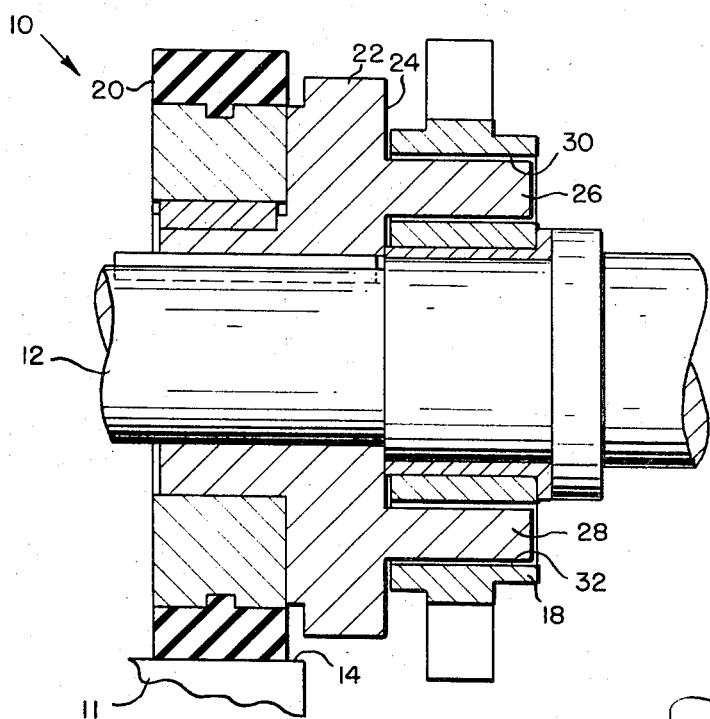
FIGURE 2 is a view taken along lines 2—2 of FIGURE 1.
Figure 4:
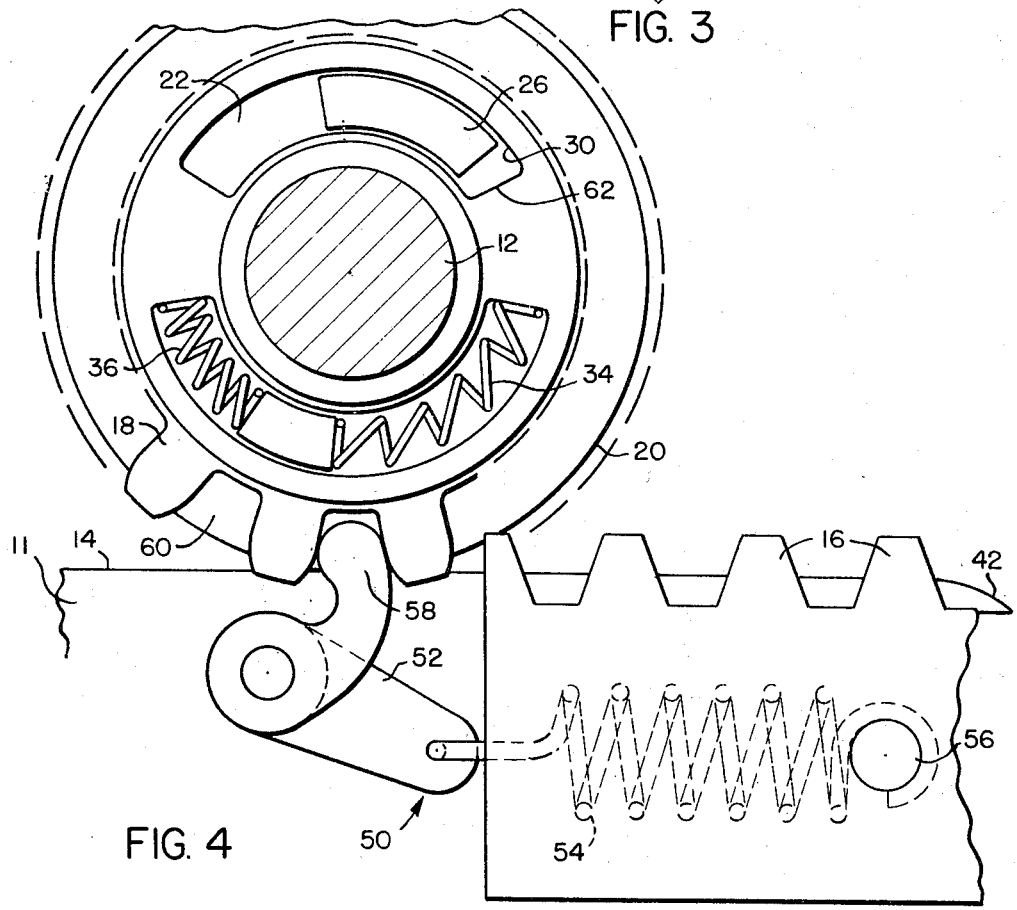
FIGURE 4 is a view showing the pinion correctly oriented by the gear engagement device of my invention for smoothly meshing with a rack.

Referring now to the drawings, FIGURES 1 and 2 show a drive assembly generally indicated at 10, which has both friction and positive drive means. Such a drive assembly could be used to drive rail guided vehicles as for example in monorail systems in which the rail guided vehicle is adapted to travel vertically as well as horizontally. Drive assembly 10 is mounted to any suitable rail guided vehicle, not shown, and travels along a rail 11 which includes a friction drive portion 14 and a positive drive portion or rack 16 (FIGURE 4). The drive assembly 10 includes a shaft 12 which is rotated by any suitable drive means, not shown, carried by the vehicle, a positive drive pinion gear 18 rotatably mounted on the shaft and a friction drive wheel 20 and drive collar 22 both keyed to the shaft.

Extending outwardly from one face 24 of the drive collar generally parallel with the axis of shaft 12, is a drive dog 26 and a spring seat 28, the dog and seat being spaced approximately 180° apart. Pinion 18 is provided with a pair of arcuate slots 30 and 32 which extend through pinion 18 for receiving drive dog 26 and spring seat 28 respectively. A pair of springs 34 and 36 are disposed in slot 32, one of the springs being positioned on each side of spring seat 28 so that the spring seat is biased away from the ends 38 and 40 of arcuate slot 32 (FIGURE 1).

As shown in FIGURE 1 spring seat 28 and springs 34 and 36 comprise a resilient coupling means which connects drive shaft 12 to pinion 18. Thus, during the friction drive stage, when friction wheel 20 is in engagement with the frictional drive track portion 14, the pinion is not driving and is in an idle condition; that is, power from shaft 12 is transmitted through drive collar 22, spring seat 28 and springs 34 and 36 to pinion 18 to produce co-rotation of the shaft and pinion. In this idle condition, spring seat 28 is located in about the center of slot 32 which in turn locates dog 26 in about the center of slot 30. Note, however, that due to the length of arcuate slots 30 and 32, pinion 18 can rotate almost 180° with respect to shaft 12 simply by compressing one or the other of springs 34 or 36, the limit of rotation being defined by the engagement of dog 26 with the ends of arcuate slot 30.

Referring to FIGURE 4, the portion of rail 11 shown comprises the entrance to the positive drive portion of the rail. As shown in the broken away portion of FIGURE 4, the friction drive portion 14 of the rail has a tapered end section 42 so that friction drive wheel 20 will not be in contact with rail 11 during the positive drive stage of operation when pinion 18 is engaged with rack 16.

Located immediately adjacent to, but preceding rack 16 is a gear orienting means generally indicated at 50 which includes a latch member 52 pivoted to rail 11 and a coil spring member 54. Spring 54, which is stronger than either spring 34 or 36, extends between latch 52 and a peg 56 fixed to rail 11 to keep one arm 58 of the latch pivoted into the path of travel of pinion 18. Latch arm 58 is designed to mesh with the gullet or space 60 between successive pinion teeth, the orientation or space between latch arm 58 and rack 16 is an integral number of pitch lengths so that if arm 58 falls into the space 60, the pinion will be in a position to mesh smoothly with rack 16. However, if there is interference between the teeth of the pinion and arm 58, the pinion teeth will not mesh smoothly with the rack but will interfere with the rack teeth, causing possible damage to either the pinion or rack or both. In such a case, the gear orienting means 50 is adapted to reorient the pinion to permit the pinion teeth to mesh smoothly with the rack.

Figure 3:
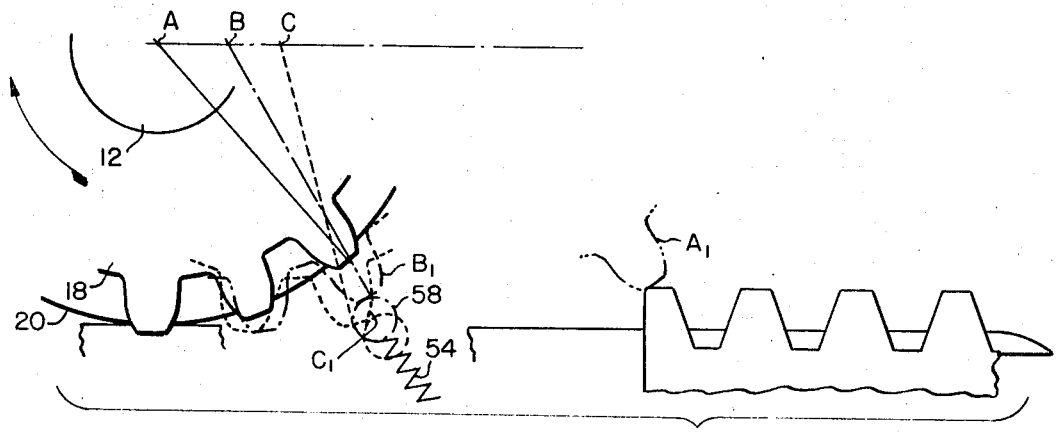
FIGURE 3 is a schematic representation of the operation of the gear engagement device of my invention.

In order to describe the operation of my gear engagement device and by way of illustration only, assume that drive assembly 10 is in friction drive stage and is approaching rack 16 as shown in FIGURES 3 and 4 preparatory to entering the position drive stage. In friction drive shaft 12, being keyed to friction drive wheel 20, supplies power directly to the wheels to rotate the wheels clockwise for moving the drive assembly from left to right as viewed in FIGURES 3 and 4. Shaft 12 also rotates pinion 18 clockwise through the resilient coupling comprising spring seat 28 of drive collar 22 and springs 34 and 36. Since there is no load applied to pinion 18, it should be appreciated that in the friction drive stage the pinion is idling and spring seat 28 remains approximately the center of arcuate groove 32 as shown in FIGURE 1. The friction drive remains engaged to carry pinion 18 into a meshing relationship with rack 16 after which the friction drive disengages due to the tapering of the friction surface at 42 permitting the pinion to drive positively across rack in a manner set out hereinbelow.

Upon approaching the positive drive portion, it is very probable that pinion 18 will not be in a position to mesh smoothly with rack 16. For example, as shown schematically in FIGURE 3, the attitude of pinion 18 at position A is such that the pinion would interfere with the teeth of rack 16 as shown by phantom lines $A_1$. However, since pinion 18 is not correctly oriented to the teeth of rack 16, the teeth of pinion 18 will contact arm 58 of the spring loaded latch 52 as shown in phantom at $B_1$ before entering the rack. This engagement between the pinion teeth and arm 58 first causes the latch to pivot against the bias of spring 54 so as to move arm 58 to a depressed position out of the path of travel of the pinion. Further linear travel and clockwise rotation of the pinion to the position indicated at C brings the depressed latch arm 58 to bear against the side of the pinion tooth, as shown in dotted line at $C_1$. Since, as stated hereinabove, spring 54 is stronger than either of springs 34 or 36, arm 58 and therefore latch 52 will be urged back to a normal position by the bias of spring 54. In moving back to a normal position under the urging of spring 54, latch arm 58 bearing against the side of the pinion tooth will cause pinion 18 to rotate clockwise with respect to the shaft 12 against the bias of spring 36 until latch arm 58 seats in the gullet or space 60 between two successive pinion teeth as shown in FIGURE 4. As stated hereinabove, the orientation between latch arm 58 and rack 16 is such that when the arm falls into space 60, pinion 18 is correctly oriented for smooth engagement with the rack. Accordingly, rotation of pinion 18 and the seating of latch arm 58 in space 60 orients the pinion so that it will mesh smoothly with the rack.

Referring now to FIGURE 4, it would be apparent that with latch arm 58 in space 60 the bias of spring 54 acting on the arm will permit the pinion to travel linearly but will prevent the pinion from co-rotating with shaft 12 and hold the pinion in this correctly oriented position until drive dog 26 carried by drive collar 22 is rotated by shaft 12 into engagement with end 62 of arcuate slot 30. The engagement of drive dog 26 and the end of arcuate slot 30 provides a positive connection from the drive means (not shown) through shaft 12, drive collar 22, drive dog 26 and pinion 18 so that the pinion can now be driven across rack 16.

Thus, it will be appreciated that my invention accomplishes its intended objects providing a gear engagement device which quickly and efficiently orients a pinion or gear while it is in motion so that its teeth will be in the correct relationship to mesh smoothly with a rack or stationary gear.

While I have described the operation of my gear engaging device as rotating pinion 18 in a clockwise direction, it should be appreciated that pinion 18 is capable of either counterclockwise or clockwise rotation with respect to shaft 12 against spring bias 34 and 36 respectively, depending upon the initial point of contact between the teeth of pinion 18 and spring loaded latch 52.

Furthermore, it should be appreciated that while I have described the preferred embodiments of my invention, various modifications can be made therein without changing the spirit and scope of the invention as set out in the appended claims.

Having thus described my invention in detail, what I claim as new is:

1. In combination with a rail guided vehicle having at least two driving means, one of said means being a rack and pinion drive engaged for only a portion of the travel of said vehicle, means for smoothly engaging said rack and pinion drive comprising:
    (a) a drive shaft journaled to said vehicle;
    (b) a pinion rotatably mounted on said shaft and adapted to mesh with said rack;
    (c) means for limiting the relative rotation of said pinion to said shaft;
    (d) resilient means interposed between said pinion and said shaft for normally maintaining said pinion in a position intermediate to its limits of rotation with respect to said shaft; and
    (e) orienting means located in the path of travel of said pinion and preceding said rack for engaging and rotating said pinion relative to said shaft and against said resilient means for orienting said pinion with respect to said rack so that said pinion and rack may mesh smoothly.

2. The combination as set forth in claim 1 in which said orienting means comprises:
    (a) a member movably mounted in the path of travel of said pinion and positioned to engage the teeth thereof;
    (b) a second resilient means for normally maintaining said member in position to engage the teeth of said pinion;

(c) said member being adapted to move from the path of travel of said pinion against the urging of said second resilient means when said member is engaged by a tooth of said pinion; and (d) said member being adapted to spring back to its original position under the urging of said second resilient means and against the influence of said first resilient means for rotating said pinion with respect to said drive shaft.

3. The combination as set forth in claim 2 in which said second resilient means comprises a spring having one end connected to said rack and another end connected to said member.

4. The combination as set forth in claim 2 in which said member includes an arm extending into the path of travel of said pinion, said arm being adapted to mesh with said pinion and being spaced an integral number of pitch lengths from said rack, whereby said arm will mesh smoothly with said pinion when said pinion is oriented to mesh smoothly with said rack and will interfere with the teeth of said pinion when said pinion is not oriented to mesh smoothly with said rack.

5. The combination as set forth in claim 1 in which said pinion has a first arcuate slot formed therein for receiving said first mentioned means and a second arcuate slot formed therein for receiving said resilient means.

6. The combination as set forth in claim 5 in which said first mentioned means is a dog fixed to said drive shaft and extending into said first arcuate slot.

7. The combination as set forth in claim 6 in which said resilient means comprises:

(a) a spring seat carried by said drive shaft and extending into said second arcuate slot; and (b) a spring element disposed in said second arcuate slot and biased between said seat and an end of said slot.

8. The combination as set forth in claim 7 in which a pair of said spring elements are disposed in said second arcuate slot, one of said elements being on each side of said spring seat for normally holding said seat substantially centered in said second slot.

9. The combination as set forth in claim 7 in which said dog and spring seat are formed integral a drive collar fixed to said shaft, said dog and spring seat being approximately 180° apart and extending outwardly from said drive collar and into said first and second arcuate slots respectively.

References Cited

UNITED STATES PATENTS

| | | | |
|---|---|---|---|
| 2,046,661 | 7/1936 | Strauss | 74—422 X |
| 2,058,431 | 10/1936 | Eschenbacher | 74—422 |

FOREIGN PATENTS 637,983   5/1950   Great Britain.

DONLEY J. STOCKING, *Primary Examiner.*

LEONARD H. GERIN, *Assistant Examiner.*

U.S. Cl. X.R.

74—411; 238—123